June 22, 1943.    M. SIGMUND    2,322,548
FILTER
Filed July 1, 1941    4 Sheets-Sheet 1
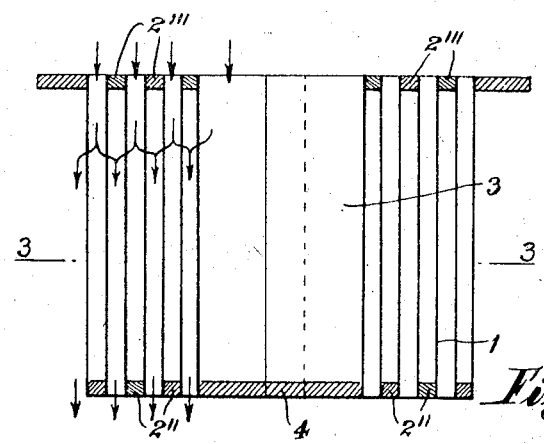
Fig. 2.
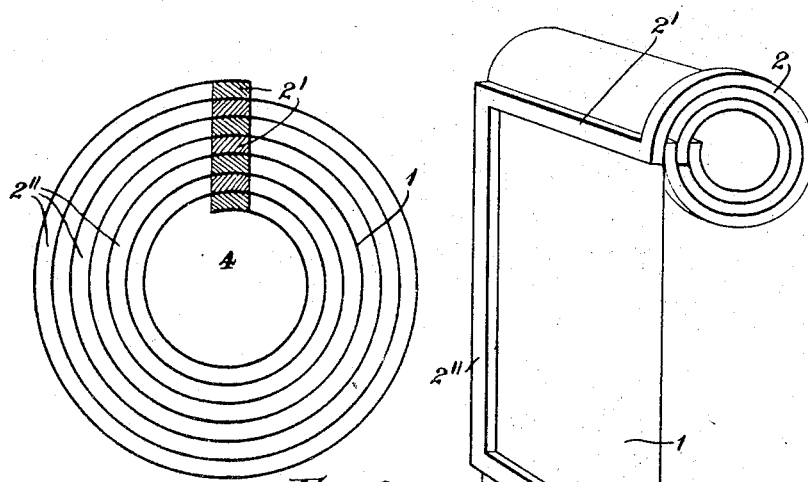
Fig. 3.
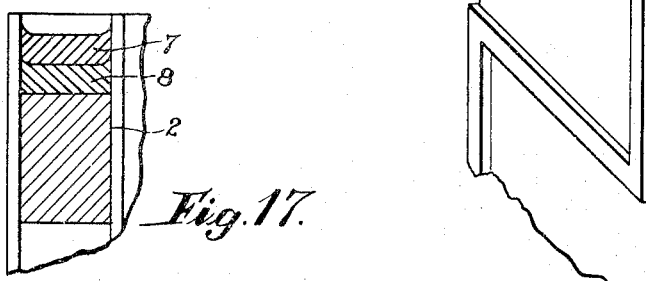
Fig. 16.
Fig. 17.
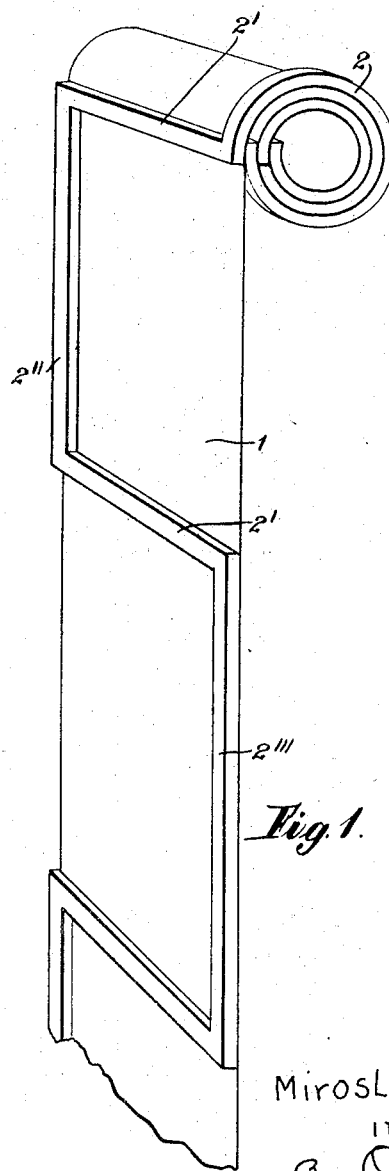
Fig. 1.
Miroslav Sigmund
INVENTOR
By (signature)
his ATTY.

June 22, 1943. M. SIGMUND 2,322,548
FILTER
Filed July 1, 1941 4 Sheets-Sheet 2

Miroslav Sigmund
INVENTOR
By Otto Munk
his ATTY.

June 22, 1943.  M. SIGMUND  2,322,548

FILTER

Filed July 1, 1941  4 Sheets-Sheet 3

Miroslav Sigmund
INVENTOR
By Otto Munk
his ATTY.

June 22, 1943.    M. SIGMUND    2,322,548
FILTER
Filed July 1, 1941    4 Sheets-Sheet 4

Miroslav Sigmund
INVENTOR
By [signature]
his ATT'Y.

Patented June 22, 1943

2,322,548

UNITED STATES PATENT OFFICE 2,322,548

FILTER

Miroslav Sigmund, Gosforth, Newcastle-on-Tyne, England

Application July 1, 1941, Serial No. 400,614
In Great Britain January 31, 1940

7 Claims. (Cl. 183—70)

This invention relates to improvements in filters, and in particular to filter inserts of the kind formed by a number of spaced layers of sheet material such as filter paper, fabric or the like so arranged and mounted that the fluid to be filtered enters selected and usually alternate spaces between the filtering layers, and is constrained to pass through the filtering material before emerging from other spaces between layers of filtering material.

The object of the present invention is to provide improved forms of filter inserts, which can be produced economically and which are reliable and efficient in use.

The invention consists in a filter insert formed by rolling up a single strip of filter paper or like filtering sheet material, or a laminated strip formed of two or more sheets of filter paper or like filtering sheet material in surface contact, to form a structure having a number of successive convolutions of increasing diameter spaced from one another, the total space between the convolutions being divided into a number of smaller spaces isolated from one another in the circumferential direction, and each such space being closed at one axial end and open at the other axial end, the open ends of some of said spaces being at one axial end of the structure and the open ends of the remainder of said spaces being at the other axial end of the structure.

Adjacent convolutions are spaced from one another by spacing members which also serve as closures for the closed axial ends of the separate spaces between convolutions, and in the preferred arrangement the spacers are arranged so that alternate spaces between convolutions are closed at axially opposite ends.

The spacing members are formed of strips of relatively thick, stiff and impervious material, and may be applied to the strip of filter paper or other filtering material before the winding operation is carried out.

Figure 5:
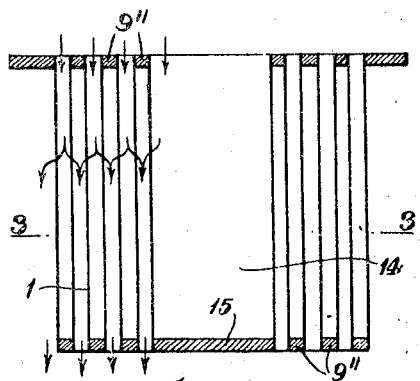
Figure 6:
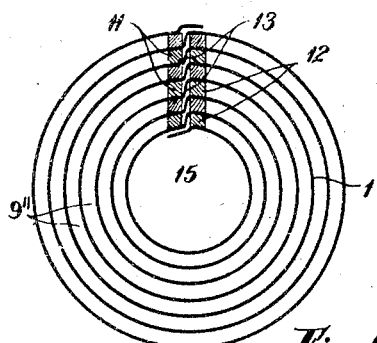
Figure 7:
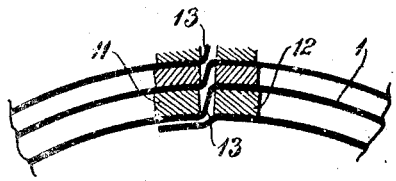
Figure 4:
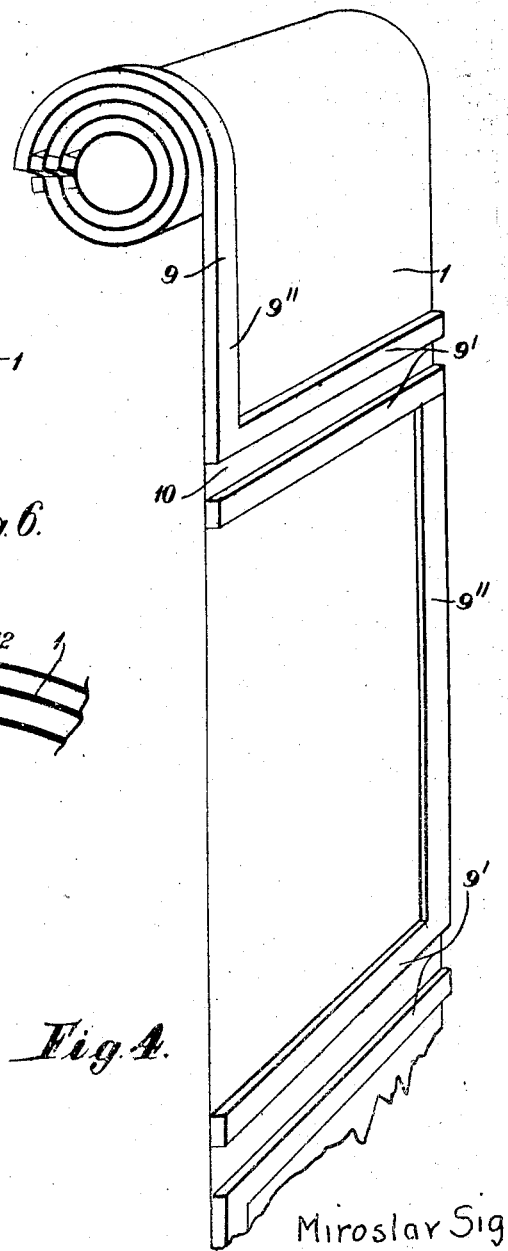

A number of examples of filter insert constructions according to the invention are illustrated in the accompanying drawings, in which:

Fig. 1 is a perspective view of a filter paper or other filtering sheet material strip with the spacing means applied thereto, in the course of being wound up to form the filter insert, Fig. 2 is a view in sectional elevation of a finished insert, and Fig. 3 is a sectional plan on the line 3—3 of Fig. 2, Figs. 4, 5 and 6 are illustrations corresponding to Figs. 1, 2 and 3 but showing an alternative construction, Fig. 7 is a detail view on a larger scale of the construction according to Figs. 4, 5 and 6, Figs. 8, 9 and 10 are illustrations again corresponding to Figs. 1, 2 and 3, but of still a further alternative construction, Figs. 11, 12, 13, 14 and 15 illustrate a construction of insert resembling generally that shown in Figs. 4 to 7 but utilising a laminated strip of filter material, Figs. 16 and 17 illustrate a method of sealing the joints between the filtering material and the spacing members.

Referring to Figs. 1 to 3, an elongated strip 1 of filter paper or other filtering sheet material has applied to one of its faces a narrow continuous strip 2 of cardboard of the shape clearly shown in Fig. 1 so that said cardboard strip 2 extends first transversely across the end of the filter paper strip 1, then for a given distance along one edge of the filter paper strip, next transversely across the width of the filter paper strip, then for a given distance along the other edge of the filter paper strip, then back across the filter paper strip and so on for the total length of the filter paper strip 1.

This paper strip 1 with the cardboard strip 2 attached, is wound, with the plain side of strip 1 inwards, into a spiral the axis of which is parallel to one end of the filter paper strip 1.

The spacing apart of the portions 2' of the cardboard strip extending transversely across the filter paper strip 1 is increased progressively so that in the wound spiral they are in register with one another so as to form in effect a unitary stiff radial wall (see Fig. 3), and these portions 2' also serve to isolate the spaces between successive convolutions within the spiral from each other, considered circumferentially.

The portions 2'' and 2''' of cardboard strip 2 extending along the opposite edges of the filter paper strip 1, serve to space adjacent convolutions of the spiral from one another and also to close adjacent spaces at axially opposite ends (Fig. 2).

One end of the central space 3 within the spiral is closed by a cardboard or other substantially impervious disc 4.

The junctions of the filter paper strip 1 and the parts 2'' and 2''' of the cardboard spacing strips 2 may be sealed by the application of a sealing material over the outer edges of the parts 2'' and 2''' and the latter may be slightly inset from the edges of the filter paper 1 as shown in Figs. 16 and 17 so that shallow channels 5 are formed for the reception of the sealing material such as bitumen or latex 6 (Fig. 16) or bitumen and latex 7 and 8, Fig. 17.

In an alternative construction as shown in Figs. 4-7 the cardboard or like spacing material, instead of being in the form of a continuous strip as in the construction according to Figs. 1-3, is formed of a number of pieces 9 each shaped to three sides of a rectangle.

These pieces are applied to the filter paper strip 1 with their parallel limbs 9' extending across the filter paper strip and with their intermediate portions 9'' extending along the longitudinal edges of the filter paper, the intermediate portions 9'' of adjacent pieces 9 extending along the opposite edges of the filter strip 1 as clearly shown in Fig. 4.

The parallel end members 9' of each pair of adjacent cardboard strips are spaced from one another as shown at 10 (Fig. 4) by a distance slightly in excess of the thickness of the cardboard strip 9, and the intermediate parts 9'' of the cardboard strips are of progressively increasing length from one end of the filter paper strip 1 to the other.

The filter paper strip 1 with the cardboard spacers 9 applied, is now wound up, with the plain side of strip 1 innermost, about an axis parallel to one end of the filter paper strip 1.

The dimensions are such that the transverse pieces 9' of the cardboard spacers 9 register to form two substantially radial walls 11 and 12, Figs. 6 and 7, close together but for the short lengths 13 of filter paper between adjacent pieces of cardboard 9'. These short lengths 13 of filter paper enable a series of concentric convolutions to be produced from the single strip 1 of filter paper, adjacent convolutions being connected by the approximately radially directed portion 13 extending between pairs of spacing members.

Adjacent spaces are closed at axially opposite ends by the parts 9'' of the spacers 9, and the central space 14 of the insert is closed at one end by a suitable impervious disc 15. The spaces between the convolutions are isolated from one another circumferentially by the portions 9' of the cardboard spacers 9 which extend transversely of the original filter paper strip 1.

Sealing of the junctions between the strip 1 and parts 9'' may be effected as in the previously described cases by means of bitumen, latex or both, as illustrated in Figs. 16 and 17.

Figure 9:
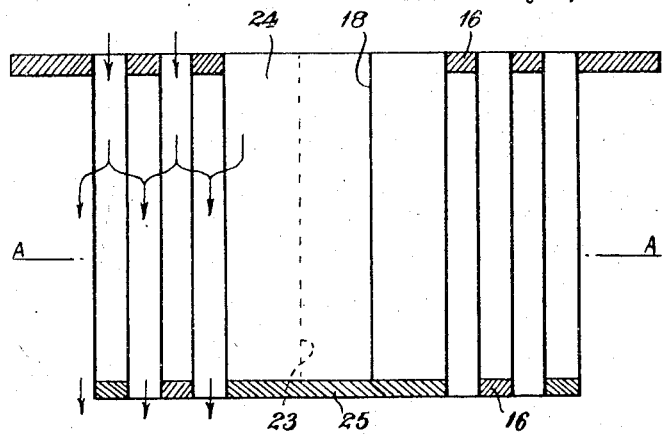
Figure 10:
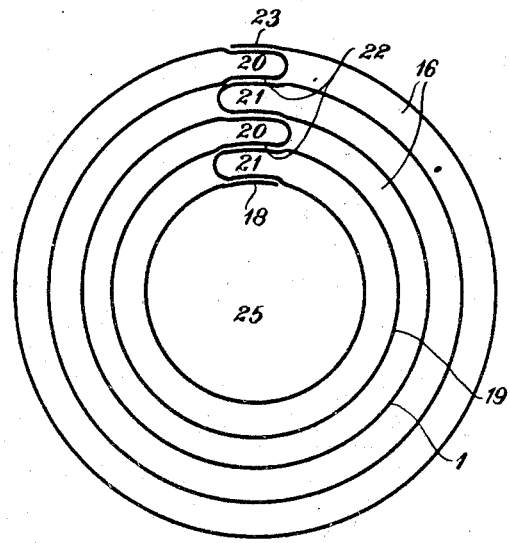
Figure 8:
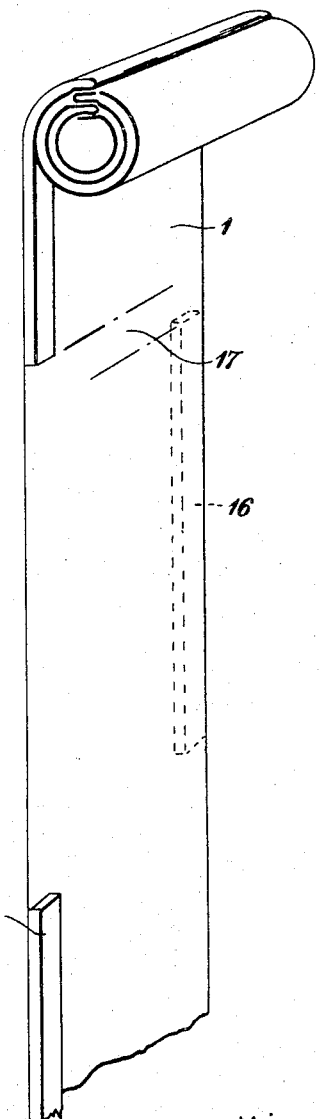

In the construction according to Figs. 8-10, a number of straight pieces of cardboard strip 16 are applied alternately at opposite edges, and on opposite faces, of a length of filter paper 1. The spacing pieces 16 are of progressively increasing length from one end of the filter strip 1 to the other and they are slightly spaced from one another as shown at 17, Fig. 8, and from the ends of the filter paper strip, considered in the longitudinal direction of the latter.

To form the insert, the end of the filter paper strip 1 to which the shortest cardboard spacer 16 is affixed, is rolled into a cylinder with the said cardboard spacer on the outside at one axial end, the free end of the filter paper 1 being stuck as indicated at 18 (Fig. 10) to form a closed cylinder. Thereafter the second convolution 19 is formed by further rolling the filter strip 1 but in the reverse direction so that it lies at one axial end against the first spacer 16 and is surrounded at the other end by the second spacer 16. The trailing end 20 of the second and each succeeding spacer 16 overlaps the leading end 21 of the preceding spacer 16 in the circumferential direction so that a narrow strip 22 of filter paper of double thickness is formed parallel to the axis of the cylinder in each convolution, and these two thicknesses of paper are in each case stuck together. The process of rolling is continued, each convolution being wound in the reverse direction to the preceding convolution until the whole filter paper strip is wound and the final short overlapping end 23 stuck down to complete the insert. One end of the central space 24 is closed by a cardboard or like impervious disc 25. Thus is formed an insert having a number of concentric annular spaces isolated from one another considered circumferentially by the reverse folds of the filter paper, and alternate spaces being closed at axially opposite ends by the cardboard spacers 16.

The joints between the spacers and the filter strip may be sealed with bitumen, latex or the like as previously described in connection with Figs. 16 and 17.

The efficiency and life of filter inserts of the kind described above varies with the thickness of the sheet material employed, and in many cases thick filtering sheet material is to be preferred.

On the other hand thick filter paper, asbestos sheet and like filtering sheet materials are less pliable than similar thin materials, and where the sheet material is to be rolled into convolutions of small radius, for example when forming relatively small filters, or when forming the inner turns, the stretching adjacent the outside surface and compression adjacent the inside surface gives rise to buckling or creasing and even tearing or breakage, and any of these eventualities destroys the utility of the filter structure by allowing contaminated air for example to seep through.

In accordance with a further feature of the present invention the advantages of a thick walled filter insert are achieved without the attendant disadvantages described above, by rolling up a laminated sheet formed of two or more thin sheets of filtering material in surface contact, the rolling operation being carried out in the manner previously described.

Figure 13:
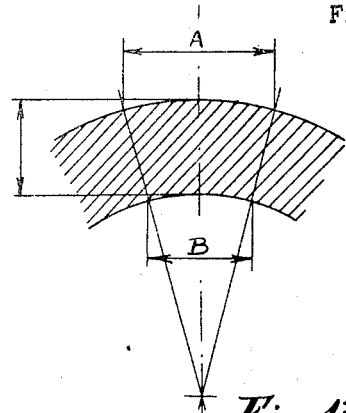

Fig. 13 illustrates in a somewhat exaggerated manner by comparison of the dimensions A and B, the very considerable tension involved on the outside and compression involved on the inside due to the large difference between the internal and external radii, when a thick sheet of filtering material is being wound.

Figure 14:
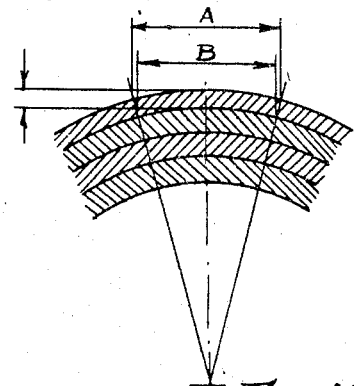

When rolling a laminated sheet, on the other hand, the individual laminations move with regard to one another to take account of the difference between the internal and external radii of each turn so that the stresses to which the individual layers are subjected are very small, as will be readily seen from a comparison of dimensions A and B in Fig. 14, which shows a part of a filter wall which is the equivalent of that shown in Fig. 13 but formed of a laminated sheet.

Instead of rolling a prepared laminated sheet, a single sheet may be rolled in such a manner as to form a filter insert each convolution of which is formed of several layers in surface contact.

Figure 11:
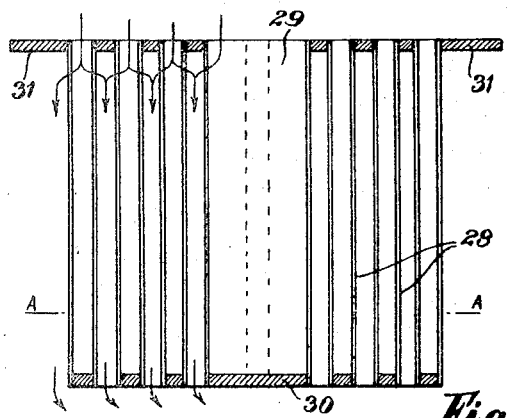
Figure 12:
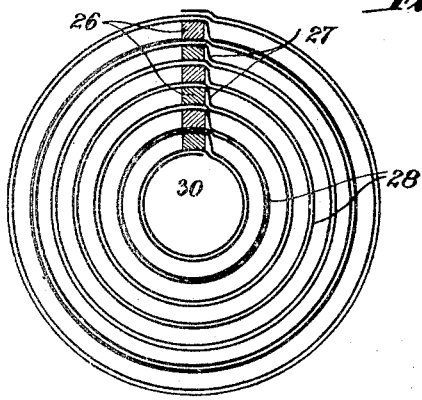

Figs. 11 and 12 illustrate in sectional elevation and plan, an insert in which each convolution is formed of a plurality of layers of thin filtering material in surface contact.

In this case a single thin strip of filtering material is employed, with spacing strips applied thereto before winding or rolling, as in the previously described constructions but so spaced from one another that each convolution 28 of the insert is formed of two or more turns in surface contact, the outer turn of each convolution being connected to the inner turn of the next succeeding convolution by a stepped portion 27 as shown in Fig. 12. The transverse portions 26 of the spacers register with one another as before to form a radial wall.

Figure 15:
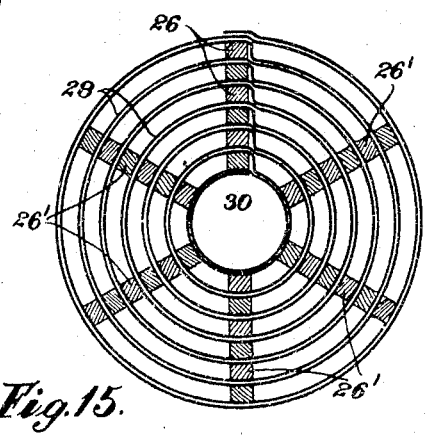

Fig. 15 illustrates a further construction of insert in which the space between each pair of convolutions is divided into smaller spaces by additional transverse spacing strips 26'.

One end of the central space 29 is closed by a cardboard or other impervious disc 30 as before, and the joints between the spacers and the filter strip at the axial ends of the inserts are sealed by luting as before.

In some cases thick sheet filtering material may be used for the outer or large diameter convolutions and laminated sheet material for the inner or small diameter convolutions only.

Again the laminated sheet may be formed of thin sheets of different filtering materials arranged in surface contact.

The improved inserts are particularly well adapted for use as filters for smokes in respirators for personal use, gas shelter filtration plant and the like, being provided with external impervious sealing flanges 31 at the end opposite the discs 4, 15, 25 or 30, and mounted for example in metal containers (not shown) having inlet and outlet apertures at opposite ends. The contaminated air or other fluid to be filtered entering the container is constrained to pass into the open ends of some of the spaces between the convolutions, as shown by the arrows in the drawings and then through the filtering walls before emerging through the spaces open at the other end of the filter and away through the outlet from the container.

The filter paper or other material may be impregnated with chemical materials to effect a chemical purification as well as a filtering action on the air or other fluid.

I claim:

1. A filter insert comprising a single, relatively wide strip of sheet filtering material wound into a structure having a number of successive convolutions of increasing diameter, the total space between the convolutions being divided into a number of smaller spaces isolated from one another in the circumferential direction, and narrow, relatively short strip portions of relatively thick impervious material applied alternately to opposite edge portions of said strip of filtering material before winding to space the convolutions from one another and close one axial end of each of the smaller spaces between convolutions in such a manner that smaller spaces which are adjacent to each other in radical direction are separated by a layer of filter material and closed at opposite axial ends.

2. A filter insert comprising a single, relatively wide strip of sheet filtering material wound into a structure having a number of successive convolutions of increasing diameter, and means applied to one side only of said strip of filtering material before winding to space adjacent convolutions from one another, said spacing means including narrow strip portions of relatively thick impervious material disposed between each pair of adjacent convolutions in the axial direction of the structure and dividing the total space between the convolutions into a number of smaller spaces isolated from one another in the circumferential direction and narrow, relatively short strip portions of relatively thick impervious material disposed between and closing one axial end of each smaller space between adjacent convolutions, in such a manner that smaller spaces which are adjacent to each other in radial direction are separated by a layer of filter material and closed at opposite axial ends.

3. A filter insert comprising a single, relatively wide strip of sheet filtering material wound into a structure having a number of successive convolutions of increasing diameter and a single continuous narrow strip of relatively impervious material applied to one side of the strip of filtering material before winding, and shaped to extend longitudinally for spaced lengths along opposite edges of the strip of filtering material and transversely across the width of the strip of filtering material, each length of impervious strip on one edge of the filtering material being opposite a space on the other edge of the filtering material and each end of each longitudinally extending portion of impervious strip being connected with a transversely extending portion of impervious strip.

4. A filter insert comprising a single, relatively wide strip of filtering material wound into a structure having a number of concentric cylindrical convolutions connected with each other by radially directed portions and spacing means for the convolutions comprising a plurality of pieces of impervious narrow strip material applied to one side of the strip of filtering material before winding each piece of impervious material being shaped to define three sides of a rectangle and said pieces being applied to one side of the filtering strip in longitudinally spaced relationship and with the intermediate parts of successive pieces extending along opposite edges of the strip of filtering material.

5. A filter insert, as claimed in claim 1, wherein the strip portions of impervious material closing axial ends of the spaces between convolutions are of successively increasing length in the direction from the inside to the outside of the structure.

6. A filter insert comprising a single, relatively wide strip of sheet filtering material wound into a structure having a number of successive concentric cylindrical convolutions of increasing diameter and each of which is formed by winding in the opposite direction to those adjacent thereto about the axis of the structure so that adjacent spaces between convolutions are isolated from one another in the circumferential direction and means to space adjacent convolutions from one another and to close one axial end of each space between convolutions comprising narrow, relatively short strips of relatively thick impervious material of progressively increasing length and applied alternately to oppose sides and opposite edges of the strip of filtering material before winding, each length of strip of impervious material on one edge lying opposite a space of slightly greater length between the ends of two adjacent strips of impervious material on the other edge of the strip of filtering material.

7. A filter insert as claimed in claim 1, in which each convolution of said structure is formed of a plurality of layers of sheet filtering material in surface contact with one another.

MIROSLAV SIGMUND.